United States Patent [19]
Sherman

[11] 3,837,619
[45] Sept. 24, 1974

[54] ADJUSTABLE VALVE FOR USE ON IRRIGATION PIPES

[76] Inventor: Roger M. Sherman, 3381 Stevens Creek Blvd., San Jose, Calif. 95117

[22] Filed: Jan. 14, 1974

[21] Appl. No.: 432,868

Related U.S. Application Data

[63] Continuation-in-part of Ser. No. 353,746, April 23, 1973, Pat. No. 3,794,294.

[52] U.S. Cl. ............ 251/145, 251/353, 137/625.3, 61/12
[51] Int. Cl. .......................................... F16k 31/58
[58] Field of Search ........... 251/145, 351, 353, 146, 251/349, 350, 352, 354; 137/625.3; 61/12; 285/DIG. 22; 239/542

[56] References Cited
UNITED STATES PATENTS

| | | |
|---|---|---|
| 2,693,203 | 11/1954 | Hempel .......................... 251/145 X |
| 2,925,989 | 2/1960 | Hempel .............................. 251/145 |
| 2,925,990 | 2/1960 | Hempel .............................. 251/145 |
| 2,925,991 | 2/1960 | Hempel .............................. 251/145 |
| 3,207,388 | 9/1965 | Waddington et al. ........ 285/DIG. 22 |
| 3,717,324 | 2/1973 | Milde ................................ 251/145 |

Primary Examiner—William R. Cline

[57] ABSTRACT

An adjustable valve for use on irrigation pipes to control or to shut off the water flow. This device is provided with a flexible grommet that is inserted into a hole in the irrigation pipe and supports the valve member on the pipe. The grommet is provided with a tapered inwardly projecting lip that extends a short distance into the irrigation pipe and frictionally engages the body of the valve member. This grommet lip is stretched slightly by a tapered flange that is provided on the valve member when the valve member is inserted into the grommet. This lip contracts to grip the body of the valve member after the tapered flange of the valve member is pressed through the grommet. The valve member may be adjusted in the grommet to control the water flow out of the pipe through openings in the body of the valve member. When it is desired to close the valve, the valve member is moved outward until the grommet lip and tapered flange engage each other. These parts also limit the outward withdrawal of the valve member from the grommet.

2 Claims, 5 Drawing Figures

PATENTED SEP 24 1974　　3,837,619
FIG. 1
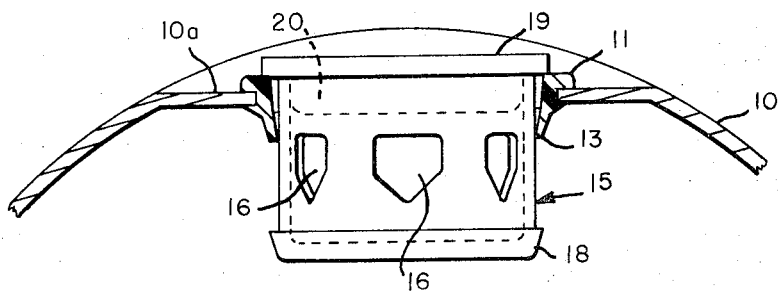
FIG. 3
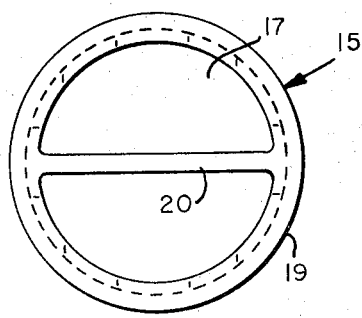
FIG. 4
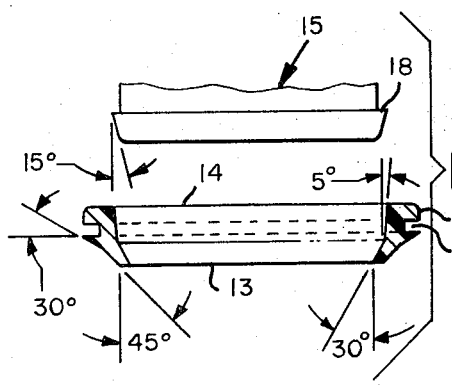
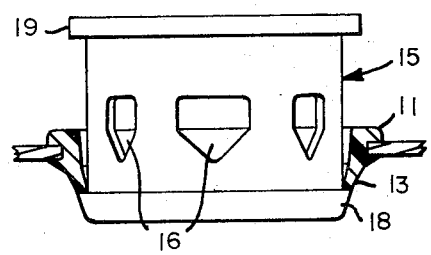
FIG. 2
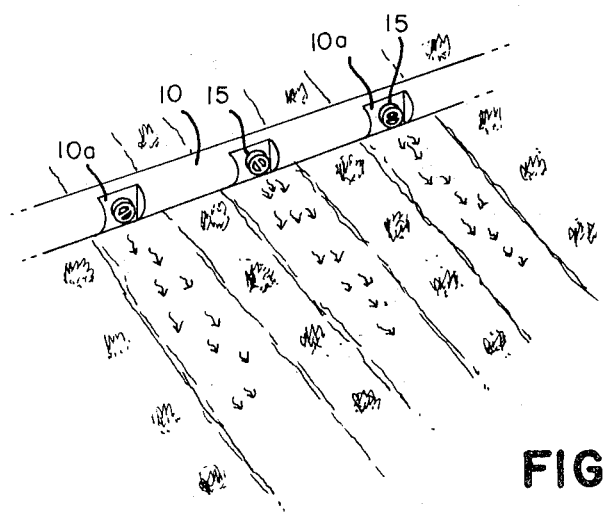
FIG. 5

ADJUSTABLE VALVE FOR USE ON IRRIGATION PIPES

This application is a continuation-in-part of my application Ser. No. 353,746, filed Apr. 23, 1973 now U.S. Pat. No. 3,794,294.

DESCRIPTION OF THE INVENTION

This invention relates to adjustable valves provided to an irrigation pipe to control the water flow therefrom.

An object of this invention is to provide an improved adjustable valve for use on irrigation pipe, said valve being constructed so that it may be easily installed on the irrigation pipe and also so that it may be economically and efficiently manufactured.

Another object of this invention is to provide an improved water flow control device for irrigation pipe, said device comprising a grommet of flexible material attached to a hole in the irrigation pipe and a valve member slidable in the grommet so that the water flow therethrough may be controlled, said valve member having the inner end thereof formed so that it temporarily deforms the grommet when it is inserted thereinto and thereafter cooperates with the grommet so that the valve member may not be accidentally withdrawn therefrom.

Another object of this invention is to provide an improved water flow control device for irrigation pipe, said device being made in two parts, one of which consists of a grommet of flexible material that is attached to a hole in the irrigation pipe and the other of which consists of a rigid valve member having a body with a diameter slightly more than the diameter of the hole through the grommet. The valve member is provided with a tapered flange at the bottom thereof which has a diameter approximately equal to the diameter of the hole at the top of the grommet. When the valve member is inserted into the grommet it temporarily expands the inwardly projecting lip provided to the bottom of the grommet. After the valve member body is inserted into the grommet the inwardly projecting lip engages the shoulder behind the flange on the body member and prevents accidental withdrawal of the valve member when the valve member is moved to its closed position.

Other and further objects of this invention will be apparent to those skilled in the art to which it relates from the following specification, claims and drawing.

In accordance with this invention I have provided a valve unit for use on irrigation pipes. This unit is made in two parts, one of which is a grommet of flexible material such as rubber, plastic or the like that is inserted into a hole provided to the irrigation pipe. The other part is a valve member having a body that is slidable in the grommet. The grommet and valve member may be made in different shapes that is they may be round, square, hexagonal, etc., as desired. The valve member is provided with flanges at the ends thereof and the body between these flanges is provided with a plurality of holes through which water flows out of the irrigation pipe into the hollow body when these holes are exposed inside the irrigation pipe. The grommet is provided with an inwardly tapered lip that extends into the irrigation pipe when the grommet is assembled therewith. The diameter of the hole at the lip portion of the grommet is slightly less than the diameter of the body of the valve member. The diameter of the hole in the upper part of the grommet is greater than the diameter of the body of the valve and is approximately equal to the diameter of the large end of the tapered flange at the bottom of the valve member. Thus, when this tapered flange is inserted into the grommet and pressed through the grommet it expands the inwardly tapered lip. After the tapered flange is inserted through the grommet the tapered lip snaps back against the body of the valve member. Thereafter this lip frictionally engages the body of the valve member and holds the valve member in any selected adjustment so that the flow of water out of the irrigation pipe through the valve member may be adjusted and controlled.

Further details and features of this invention will be set forth in the following specification, claims and drawing, in which:

FIG. 1 is a view showing the open position of the valve embodiment of this invention which is illustrated installed in an irrigation pipe that is shown partially cut away;

FIG. 2 is a view similar to FIG. 1 showing the valve embodiment in closed position;

FIG. 3 is a view showing the top of the valve member;

FIG. 4 is a fragmentary view showing the valve member partially broken away, positioned above the grommet prior to being inserted into the grommet; and FIG. 5 is a view of a section of irrigation pipe with valves of this invention provided thereto.

Referring to the drawing in detail, reference numeral 10 is a fragmentary sectional view of a conventional irrigation pipe made of material such as aluminum, galvanized iron, plastic, or the like. Pipe 10 is provided with a flattened portion 10a having an opening large enough to receive the grommet 11 which is of flexible material such as rubber, plastic or the like. The hole into the pipe 10 may be round, square, hexagonal, or similar configurations and of course, the shape of the grommet 11 must correspond to the shape of the hole in the pipe 10 so that the recess 12 provided in the grommet engages the sides of the hole snugly.

The grommet 11 being of flexible material may be deformed when it is inserted into the hole in the pipe 10 and it resumes its normal shape after the edge of the hole in the pipe 10 is positioned in the recess 12. The bottom of the grommet 11 is provided with a tapered inwardly projecting lip or flange 13 and the diameter of the hole through the grommet 11 at the lip 13 is substantially smaller than the diameter of the hole at the top 14 of the grommet.

The valve member 15 is provided with a body portion having a plurality of holes 16 formed therethrough. The valve member 15 is provided with a bottom 17 and a tapered flange 18 surrounding the bottom. The largest diameter of the tapered flange 18 is substantially equal to the diameter of the hole through the grommet 11 at the top 14 thereof. Thus, when the valve member 15 is to be assembled with the grommet 11 which is positioned in the hole in the irrigation pipe 10, the flange 18 is inserted into the hole at the top 14 of the grommet and pressed against the inwardly tapered lip 13. Exerting pressure on the valve member causes the flange 18 to temporarily expand the lip 13 until flange 18 clears this lip at which time the lip snaps back to its normal shape and frictionally engages the body of the valve member as shown in FIG. 2. The lip 13 also engages the shoulder of the flange 18 and prevents accidental withdrawal of the valve member from the grommet.

Pressing the valve member 15 further into the pipe causes the openings 16 to clear the lip 13 of the grommet as shown in FIG. 1 so that water can flow out of the pipe 10 into the hollow of the valve member 15 and out through the open top thereof. In order to open the valve fully the valve member 15 is pressed all the way into the pipe until the top flange 19 engages the top of the grommet 11 thereby limiting the inward movement of the valve member. It will be noted that the bottom surfaces 16a of the holes 16 are of V-shape in order to prevent the lip 13 which is of flexible material from gripping these bottom surfaces when the valve body is pulled upward to the position shown in FIG. 2 to close the valve. Of course, these bottom surfaces may be provided with other angular orientations to accomplish this purpose. The valve member is also provided with a handle 20 that is positioned across the top of the hollow body and this handle may of course be gripped when it is desired to pull the valve member 15 into its closed position shown in FIG. 2.

While I have shown and described a preferred form of the invention, it will be understood that the invention is capable of variation and modification thereof so that its scope should be limited only by the scope of the claims appended hereto.

What I claim is:

1. A valve for controlling the flow of water from an irrigation pipe, the combination of a grommet of resilient material, said grommet having a recess in the outer surface thereof, said recess receiving the edge of an opening formed in part of the wall of an irrigation pipe, a hollow valve member supported by said grommet, said valve member having an end wall forming the bottom thereof, said valve member also having a tapered flange extending beyond the sides thereof and surrounding said bottom, the body of said valve member having a plurality of holes in the sides thereof, said grommet having a hole therethrough and the diameter of said hole at the top of said grommet being large enough to receive said tapered flange, said grommet also having an inwardly tapered lip at the bottom thereof for frictionally engaging the sides of the body of said valve member, said valve member having a top flange around the open top thereof, said valve member being adjustable with respect to said grommet so that said holes of said valve member open into the inside of the irrigation pipe when said top flange is adjacent to said grommet, said valve member being closed with respect to said irrigation pipe when said end wall is positioned in close proximity to the bottom of said grommet.

2. A valve for controlling the flow of water as set forth in claim 1, further characterized in that the slope of said tapered flange is substantially parallel to the inclined inner surface of said tapered lip when said tapered flange first engages said tapered lip during the assembly of said valve member with said grommet, and said tapered lip is expanded by said tapered flange when said valve member is fully inserted into said grommet, thereafter said tapered lip engages the body of said valve member up to the shoulder of said tapered flange during adjustment of said valve member so that said valve member can not be accidentally removed from said grommet.

* * * * *